INVENTOR
Francis A. M. Labbé

United States Patent Office 2,972,993
Patented Feb. 28, 1961

2,972,993

APPARATUS FOR FORMING A CONTINUOUS TOBACCO FILLER

Francis Auguste Maurice Labbé, Orleans, France, assignor to Molins Machine Company Limited, London, England, a British company Filed May 5, 1959, Ser. No. 811,032

Claims priority, application Great Britain May 15, 1958

2 Claims. (Cl. 131—84)

This invention concerns improvements in or relating to apparatus for forming a continuous tobacco filler, e.g. in a continuous rod cigarette-making machine, in which the filler is formed on a perforated conveyor band which moves lengthwise through a trough having stationary opposed side walls to confine the filler laterally, suction is applied through the perforated band to compress the filler suctionally, and tobacco is continuously fed to the band along a substantial part of its length so that the filler progressively builds up on the moving band. Such apparatus will for convenience be referred to herein as "apparatus as specified." One example of apparatus as specified is disclosed in the complete specification and drawings of U.S. patent application Serial No. 738,805, filed May 29, 1958. In that construction, the opposed side walls of the trough have parts which diverge considered in a direction towards the band.

According to the present invention there is provided apparatus as specified, wherein the side walls of the trough have parts which are divergent considered in a direction towards the conveyor band, and wherein the said divergent parts are arranged at distances progressively further from the band along the length of the trough, considered in the direction of movement of the conveyor band so as to recede from the band as the filler increases in depth while moving through the trough, the parts of the side walls extending between the conveyor band and the said divergent parts being substantially parallel, whereby the lateral capacity of the trough increases along the length of the trough to relieve friction between the side walls and the filler as the latter increases in depth, while the width of the trough adjacent the band remains substantially uniform along the length of the trough.

The said divergent parts may be spaced progressively farther from the band so as to correspond in position to that part of the suctionally compressed filler which tends to exert the greatest outward pressure against the side walls.

Figure 1:
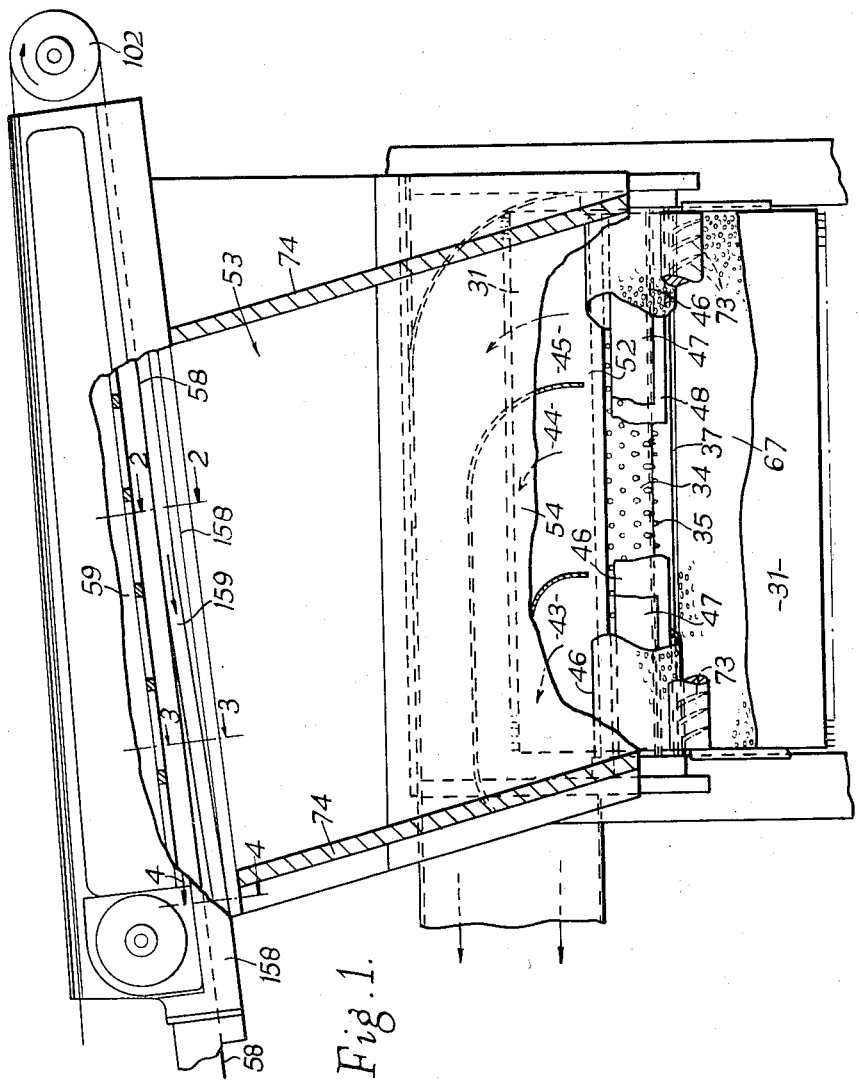
Figure 2:
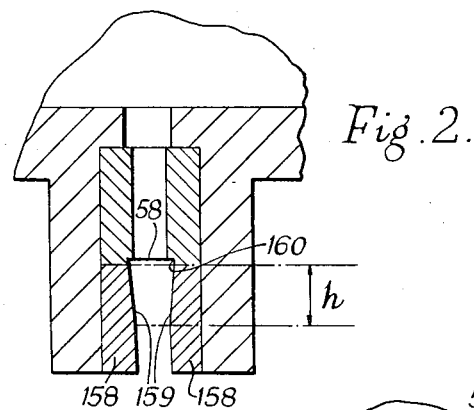
Figure 3:
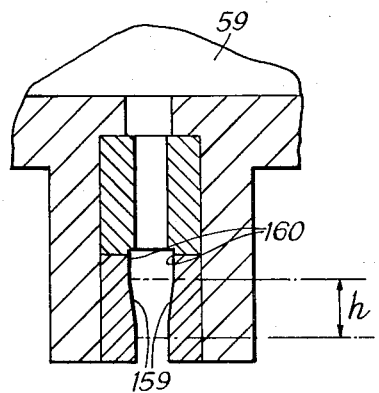
Figure 4:
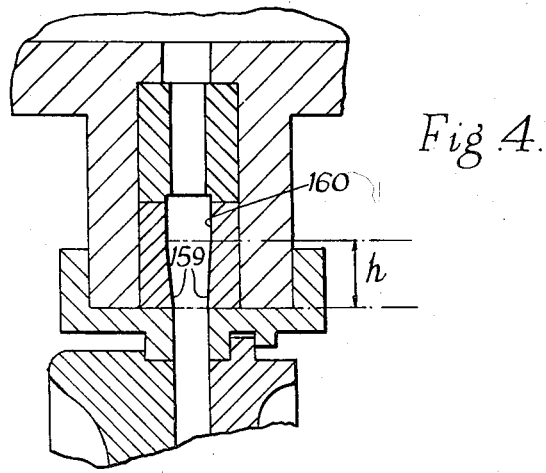

Apparatus in accordance with the invention will now be described by way of example with reference to the accompanying drawings, in which:

Figure 1 is a side view of apparatus for feeding tobacco to a perforated conveyor band and forming a filler thereon, and Figures 2, 3 and 4 are sections to an enlarged scale, on the lines 1—1, 2—2 and 3—3 respectively of Figure 1.

Referring first to Figure 1, some of the parts shown are disclosed fully in the complete specification and drawings of co-pending United States patent application Serial No. 738,805 and will be only briefly described here.

A carded conveyor drum 31 feeds tobacco from a hopper, and the tobacco is picked from the carding by picker pins 35 on a roller 34, which impel the tobacco, in a more or less separated condition, over a guide plate 37.

An air duct 42, divided into three compartments 43, 44 and 45, is arranged to draw air through a perforated cylinder 46, which is mounted for rotation about fixed members 47 and 48, and is located at the entrance to the air duct 42. The air thus drawn into the air duct is drawn across the path of tobacco particles impelled by the picker roller 34, and is directed in such a direction and with such velocity as to cause those tobacco particles to change their direction of movement, by moving in a generally arcuate path, and thus to enter a passage 53.

The passage 53 has opposite side walls which are close together, and end walls 74. Means are provided to discharge air upwardly, through a perforated plate 67, so as to enter the passage, and a suction chamber 59 at the upper end of the passage draws air upwardly through the passage at high speed, for example 40 to 45 feet per second.

A perforated endless conveyor band 58, passing over rollers, one of which is shown at 102, moves through the upper part of the passage 53 in the direction shown. The air drawn upwardly through the passage passes through the perforations in the band 58.

Tobacco particles fed into the passage 53 (as described briefly above and more fully in the complete specification referred to above) are carried at high speed by the air stream towards the conveyor band 58, on which they build up to form a filler. The tobacco particles are conveyed to the band 58 in substantially separated condition.

The conveyor band 58 runs through a trough comprising side walls 158, which confine laterally the filler built up on the band 58 and carried lengthwise thereby.

The means to draw air through the passage 53, conveyor band 58 and suction chamber 59 is arranged to exert a suctional pressure on the tobacco filler being formed on the band 58 such that the filler is compressed laterally to a density of at least half, and in the present case two-thirds, the density of the final wrapped cigarette rod.

It is found that the tobacco on any given part of the band, as it builds up on the band and is subjected to the pressure described above, progressively passes through different stages of compression. The "surface tobacco," that is, tobacco which has just reached the band at the point at which the latter enters the passage, or which has just reached the surface of the tobacco already on the band, is relatively loose and does not exert any material lateral compression on the side walls of the passage. As, however, the band moves along the passage, so the depth of tobacco increases at any given part, and gradually the "surface tobacco" recedes from the band. The density of the tobacco at any cross-section of the trough is found to be greatest at the surface of the band, rapidly decreasing until there is a "middle zone" (between this dense zone and the zone of surface tobacco), in which the tobacco is substantially of the same degree of density throughout the depth of the middle zone. That middle zone tobacco can, in some cases, apply laterally against the walls of the passage a pressure which is as much as two-thirds that applied to the tobacco compressing it against the band.

As stated above, the pressure exerted by suction through the band 58 on the tobacco filler is such as to compress the filler to a density two-thirds that of the final cigarette rod. This pressure which is, of course, exerted in a direction towards the band 58, causes the tobacco in the middle zone of the filler, or parts of it, to exert an outward pressure against the side walls of the trough, and this outward pressure is (as stated above) found to reach in some types of tobacco as much as two-thirds the pressure exerted on the filler. Such a substantial outward pressure results in considerable friction between the middle zone of the filler and the side walls of the trough, and in order to relieve this friction the side walls 158 of the trough are, as shown in Figures 2, 3 and 4, provided with parts 159 which diverge in a direction towards the conveyor band and are of a height $h$ sufficient fully to cover the middle zone. By this arrangement, as the tobacco in the middle zone becomes gradually more compressed by the pressure exerted towards the conveyor band, it is given the opportunity to expand slightly, thus relieving the lateral pressure between the filler and the side walls, and consequently friction, or at any rate preventing undue increase of friction such as would cause hold-ups of the filler in the trough.

It will be realised that the depth of the filler increases progressively as the conveyor band travels from right to left in Figure 1, and thus the quantity of tobacco in contact with the side walls of the trough progressively increases. Thus in a case where the diverging parts 159 are positioned along the whole length of the trough at a uniform distance from the band 58, such as the distance at which it is shown in Figure 2, the filler, as its depth increases, extends beyond the diverging parts of the trough walls, and is partly contained between parallel side walls.

As previously stated, the greater part of the outward pressure exerted by the filler against the trough walls is exerted by tobacco in the middle zone. Tobacco between the middle zone and the conveyor band 58 is sufficiently compressed to exert little if any significant outward pressure. As the upward compression of the filler is progressive, the depth of this highly compressed part of the filler close to the band 58 gradually increases, and the middle zone, that is, the zone in which the tobacco exerts the significant part of the outward pressure, recedes from the conveyor band, and therefore in a case where the diverging parts 159 are at a uniform distance from the band 58, such as the distance shown in Figure 2, along the whole length of the trough, the middle zone will at least partly extend beyond the diverging parts of the trough walls.

With tobacco such as that of the type mainly used in the United Kingdom, the arrangement just described is found to be satisfactory. With some tobaccos, however, such as some types of tobacco widely used in the United States of America, hold-ups may occur, due it is thought to this high lateral pressure applied in the middle zone.

For this reason the side walls 158 of the trough as shown in Figures 2, 3 and 4 are provided with diverging parts 159 which are positioned to correspond in position to the middle zone. Thus at the region of the trough shown in Figure 2, where the filler is at an early stage of its formation and is relatively shallow, the diverging parts 159 are quite close to the band 58, while in Figures 3 and 4, which show parts of the trough in which the filler has increased in depth, the parts 159 are further from the band. By this arrangement, the middle zone in the filler can at all times be located between divergent parts of the walls (or at any rate to a greater extent than is possible in a construction where the divergent parts are a uniform distance from the conveyor band along the whole of the trough).

In Figures 2 to 4 the extent of the diverging parts 159 is shown, for the sake of clarity, by dot and dash lines and indicated by the reference $h$, which represents a distance which is uniform in Figures 2 and 3, but slightly greater in Figure 4, which shows the cross-sectional shape of the trough beyond the passage 53, that is to the left of the passage as viewed in Figure 1.

The side walls 158 also have parallel parts 160 extending from the parts 159 to the conveyor band. This arrangement makes it possible for the divergent parts 159 to follow the middle zone, while maintaining a uniform angle of divergence, without the necessity of increasing the width of that part of the filler which is in contact with the conveyor band. This is desirable because an important feature of the apparatus with which the invention is concerned is that the filler formed on the band 58 is not only compressed to a density which is at least half (in the present construction, two-thirds) that of the final wrapped cigarette rod, but is also correspondingly small in cross-section, in order to reduce the amount of subsequent lateral compression and shaping required to be effected by the compression tongue.

Thus by the arrangement just described, the lateral capacity of the trough is progressively increased along the length of the trough, thus assisting in relieving friction between the filler and the trough walls, without increasing the maximum width of the filler formed on the band 58.

The arrangement described with reference to Figures 2 to 4 may therefore with advantage be used in cases where an arrangement in which the divergent parts 159 are at a uniform distance from the band 58, along the whole length of the trough, does not permit free passage of the filler.

What I claim as my invention and desire to secure by Letters Patent is:

1. Apparatus for forming a continuous tobacco filler on a tobacco manipulating machine, comprising a perforated conveyor having a tobacco receiving surface, opposed side walls extending along the said conveyor at opposite sides thereof and cooperating with said surface to define a trough for tobacco, tobacco feeding means to feed tobacco continuously to the said tobacco receiving surface so that a tobacco filler is progressively built up on said tobacco receiving surface as the conveyor moves, and means to apply suction through the said perforated conveyor to urge tobacco toward the said tobacco receiving surface and compress the filler transversely of its length during the building up of the filler, wherein the said side walls have parts which are divergent from each other considered in a direction toward said tobacco receiving surface, and wherein the said divergent parts extend lengthwise along the trough and diverge from the said tobacco receiving surface considered in the direction of movement of the latter, so as to be spaced progressively further from the tobacco receiving surface at successive positions lengthwise of the trough at which the filler progressively increases in depth as its building up proceeds, and wherein the said side walls have substantially parallel parts extending between the tobacco receiving surface and the said divergent parts, whereby the lateral capacity of the trough increases along the length of the trough to relieve friction between the side walls and the filler as the latter increases in depth, while the width of the trough adjacent the said tobacco receiving surface remains substantially uniform along the length of the trough.

2. Apparatus as claimed in claim 1, wherein the said divergent parts are spaced progressively farther from the band so as to correspond in position to that part of the suctionally compressed filler which tends to exert the greatest outward pressure against the side walls.

References Cited in the file of this patent

UNITED STATES PATENTS

| 1,992,749 | Gwinn | Feb. 26, 1935 |
| 2,362,225 | Ruau et al. | Nov. 7, 1944 |
| 2,629,385 | Kochalski | Feb. 24, 1953 |

FOREIGN PATENTS

| 764,551 | Great Britain | Dec. 28, 1956 |